3,050,404
METHOD FOR PREPARING FROZEN FRENCH FRIED POTATOES

Edwin Traisman, 1402 Pocohontas Drive, Madison, Wis.
No Drawing. Filed May 1, 1961, Ser. No. 106,530
2 Claims. (Cl. 99—193)

This invention relates to a new and improved frozen vegetable product and a method for preparing frozen French fried potatoes or other frozen cooked starchy vegetables.

My invention is an improvement and a continuation-in-part of my co-pending application S.N. 76,517, filed December 19, 1960, for a Method of Preparing Frozen French Fried Potatoes and the Like and Product.

Prior attempts to commercially manufacture frozen French fried potatoes have not produced a product which can compare favorably in eating quality with a French fried potato freshly prepared from raw potatoes. Most previous methods produce a finished product with a brown, somewhat crisp exterior, and a soft, pasty interior, almost as if it had been made from potatoes that had been mashed and then reformed. Flavor is definitely lacking when compared to a French fry which has not gone through a freezing state. Body is also inferior to that of a freshly prepared French fry, which characteristically has a body like a normal cooked potato. Such deficiencies of the present frozen French fries have generally been recognized. For example, Talburt et al., in "Potato Processing" (1959), p. 283, mentions the conventional frozen French fries are considered as "inferior in texture and flavor." As a result, many large users of French fried potatoes have found it necessary to continue the time-consuming practice of preparing French fries from fresh potatoes. A recognition of these defects in frozen starchy vegetables has led to the conception and development of my present invention.

It is an object of my invention to produce a frozen French fried potato which can, on short notice, be quickly converted into a high quality hot French fried potato with a minimum of effort.

Another object of my invention is a method for producing a frozen French fried potato which converts into a finished product which will compare favorably in body, flavor and eating quality to a freshly prepared French fried potato.

A further object of my invention is to produce a frozen French fried potato which can be stored indefinitely to be available in quantity for quick use when wanted.

An additional object of my invention is to produce a frozen French fried potato in which the body of the finished French fry can be controlled to best suit the finishing process used.

Other objects and advantages will be apparent from the following detailed description and explanation.

Frozen French fried potatoes, as commercially manufactured today, are usually made by peeling, cutting, washing and then heat treating potatoes either in water, cooking oil, or both. The product is then packaged, frozen and held frozen until ready to use. Such a product typically has a moisture content of about 65% at the time of freezing. The user finishes the product by immersing it in hot cooking oil until the pieces of potato brown to a desirable color.

I have found that the inferior body and flavor of present commercially manufactured frozen French fried potatoes is due to the destructive effect of freezing upon the cooked starch in the potato. It has long been known that freezing of cooked unmodified starch gels causes general destruction of the body of cooked starch. This is due to the rupture of starch granules as ice crystals are formed. I have discovered that if a good portion of the water in the cooked potato is removed proir to freezing, there is less opportunity for ice crystal formation, and hence the destructive effect of freezing may be minimized.

Tests were run to determine the effect of the moisture content of the potato strips at the time of freezing. I have established that as the percentage of moisture in the frozen potatoes decreased, firmness of body in the fully cooked French fries increased. Furthermore, at a moisture content level of somewhere between 48% and 54%, the corresponding values for firmness of body start to rise sharply. I have found that potatoes frozen while at a moisture content level between about 41% and 54% will, upon final cooking, possess the desirable qualities of texture, body and flavor of freshly prepared French fried potatoes. Such reduction in moisture before freezing minimizes the adverse effect of the freezing operation upon the potato.

An essential feature of my process is the reduction of moisture in the potato prior to freezing. As evidence of this fact, if a conventional frozen French fried potato having about 65% moisture content is subsequently cooked to reduce the moisture to the range of 41% to 54%, the resulting finished product still has a mealy, weak body and is lacking in flavor.

My processing method is as follows: Peeled, washed potatoes are cut longitudinally into strips which may measure about $4/16$ by $5/16$ inches. The strips are washed after cutting to remove free starch and immersed in cooking fat. A cooking fat temperature of approximately 300° F. has been found satisfactory. The strips are held in the fat for the amount of time necessary to decrease their moisture content to a level between 41% and 54%. They are then taken from the fat, drained to allow any excess fat to run off, cooled to room temperature, placed in a moisture-proof package, and frozen. The strips can be held in a frozen state indefinitely.

As a specific example, with the equipment used by me, if a French frying basket filled with six pounds of potato strips is introduced in 300° F. cooking fat and cooked for about eight minutes, the potatoes test about 48% moisture.

It is to be understood that the size of the potato pieces may be varied as desired, and the period of time in the cooking oil modified accordingly to provide the preferred moisture content.

When the user wishes to prepare the frozen potatoes for eating, he immerses the strips in hot fat until they turn a desirable golden brown color. Upon removal, they may be salted and eaten.

Variation of the moisture content level within the 41% to 54% range can be used to give specific body control of the finished product. For instance, potato strips cooked initially to a moisture content level of 54% or slightly less, will produce a finished product which is crisp and golden brown on the outside, with a center having a texture similar to a normal, freshly prepared French fried potato. If the producer wishes to make a firmer product, and one which will better retain its crispness even after it has cooled, he may elect to cook to about a 47% moisture content level. If he wishes to produce a very firm, very crisp product, he may cook to a 41% moisture level. It is not practical to cook to a moisture content level substantially less than 41% since the product, in subsequent finishing, is apt to become excessively firm. Nor is it desirable to cook to a moisture level substantially above 54%, because above this point the destructive effect of freezing becomes apparent.

This control of body by selection of moisture level prior to freezing is a useful feature of my discovery, since it makes it possible to tailor the product for its usage. For example, if the potatoes are prepared for a restaurant that finishes them just prior to serving, a moisture level of 53% to 54% would be suitable. If, however, they are to be used in a restaurant which finishes potatoes in advance and holds them hot until needed, it would be better to cook the potatoes to a moisture level of 41%, since these will stay crisp through prolonged holding.

The method I have developed for producing frozen French fried potatoes results in a finished product which has definitely improved body, flavor and eating quality. In addition, my method permits control of the finished body of the French fries, making them adaptable to a variety of finishing operations.

It is understood that the present invention is not confined to the particular process here described, but embraces all such modified forms thereof as come within the scope of the following claims.

I claim:

1. A method of preparing and preserving potatoes comprising, cutting the potatoes into pieces, washing the pieces to remove excess outside starch, cooking the washed pieces in hot cooking oil for a time period sufficient to reduce the moisture content of the pieces within a range of about 41% to 54% inclusive whereby to reduce ice crystal formation during subsequent freezing operations and minimize the rupture of cooked starch granules in the potato body, removing the pieces from the cooking oil, and freezing the pieces.

2. The method of preparing and preserving potatoes comprising, cutting the potatoes into strips, washing the cut strips to remove excess outside starch, immersing the washed strips in hot cooking oil having a temperature of approximately 300° F. for a time period sufficiently to reduce substantially the moisture content of the potatoes to a level no higher than 54% and no lower than 41% whereby to reduce ice crystal formation during subsequent freezing operations and minimize the rupture of cooked starch granules in the potato body, removing the strips from the cooking oil and draining off the excess fat, cooling the strips to room temperature, and freezing the strips.

References Cited in the file of this patent

Talburt et al.: "Potato Processing," April 23, 1959, AVI Publishing Co., pp. 299–301.